(12) United States Patent
Noguchi et al.

(10) Patent No.: US 7,273,228 B2
(45) Date of Patent: Sep. 25, 2007

(54) GUIDE UNIT FOR GUIDING CURTAIN AIRBAG AND CURTAIN AIRBAG DEVICE

(75) Inventors: Atsushi Noguchi, Moriyama (JP); Tetsu Mitsuo, Nissin (JP); Toshihiko Yamanaka, Hino (JP)

(73) Assignee: Takata Corporation, Tokyo (JP)

( * ) Notice: Subject to any disclaimer, the term of this patent is extended or adjusted under 35 U.S.C. 154(b) by 310 days.

(21) Appl. No.: 11/012,135

(22) Filed: Dec. 16, 2004

(65) Prior Publication Data

US 2005/0134027 A1 Jun. 23, 2005

(30) Foreign Application Priority Data

Dec. 19, 2003 (JP) .............................. 2003-422453

(51) Int. Cl.
*B60R 21/16* (2006.01)

(52) U.S. Cl. .............................. 280/730.2; 280/728.2; 280/743.2

(58) Field of Classification Search ............. 280/730.1, 280/730.2, 743.1, 743.2, 749
See application file for complete search history.

(56) References Cited

U.S. PATENT DOCUMENTS

| | | | | |
|---|---|---|---|---|
| 5,660,414 A * | 8/1997 | Karlow et al. | ............... | 280/749 |
| 6,237,938 B1 * | 5/2001 | Boxey | ...................... | 280/730.2 |
| 6,237,943 B1 * | 5/2001 | Brown et al. | ............ | 280/730.2 |
| 6,254,123 B1 * | 7/2001 | Urushi et al. | ............ | 280/730.2 |
| 6,340,172 B1 * | 1/2002 | Ohlert et al. | ............ | 280/730.2 |
| 6,371,512 B1 * | 4/2002 | Asano et al. | ............ | 280/730.2 |
| 6,435,545 B1 * | 8/2002 | Osentoski et al. | ........ | 280/730.2 |
| 6,454,296 B1 * | 9/2002 | Tesch et al. | ............. | 280/730.2 |
| 6,474,681 B2 * | 11/2002 | Peer et al. | ................ | 280/730.2 |
| 6,637,769 B2 * | 10/2003 | Peer et al. | ................ | 280/730.2 |
| 6,733,035 B2 * | 5/2004 | Thomas et al. | .......... | 280/730.2 |
| 6,783,152 B2 | 8/2004 | Tanase et al. | | |
| 6,848,711 B2 * | 2/2005 | Yamamura et al. | ...... | 280/730.2 |
| 6,866,293 B2 | 3/2005 | Ogata | | |
| 6,896,288 B2 * | 5/2005 | Tanaka et al. | ........... | 280/743.2 |
| 6,902,188 B2 * | 6/2005 | Nakamura et al. | ....... | 280/730.2 |
| 6,994,371 B2 * | 2/2006 | Bossecker et al. | ....... | 280/730.2 |
| 7,000,944 B2 * | 2/2006 | Bakhsh et al. | ........... | 280/730.1 |
| 2002/0096864 A1 * | 7/2002 | Asano et al. | ............ | 280/730.2 |
| 2002/0105172 A1 * | 8/2002 | Peer et al. | ................ | 280/730.2 |

(Continued)

FOREIGN PATENT DOCUMENTS

| | | |
|---|---|---|
| JP | 2003-54351 A | 2/2003 |
| JP | 2004-67045 A | 3/2004 |

*Primary Examiner*—Eric Culbreth
*Assistant Examiner*—Karen J Amores
(74) *Attorney, Agent, or Firm*—Foley and Lardner LLP (57) ABSTRACT

A curtain airbag device and a guide unit allow for quick deployment of a curtain airbag by smoothly guiding a link strap that connects a curtain airbag and a guide element into the space between a side edge of a pillar garnish and a vehicle member at the early stage of the deployment of the curtain airbag. When an inflator is activated, a curtain airbag is deployed downward along the cabin-side of a pillar garnish. During the deployment, the rear portion of the curtain airbag is guided by a guide rod via a link strap. The link strap starts moving downward along the guide rod when the curtain airbag begins to be deployed. At this moment the link strap is guided into the space between the pillar garnish and a weather strip by a guide member.

18 Claims, 6 Drawing Sheets

U.S. PATENT DOCUMENTS

| | | |
|---|---|---|
| 2003/0052478 A1* | 3/2003 | Peer et al. ............... 280/730.2 |
| 2003/0178822 A1* | 9/2003 | Yamamura et al. ...... 280/730.2 |
| 2005/0134027 A1* | 6/2005 | Noguchi et al. ......... 280/730.2 |
| 2005/0134029 A1* | 6/2005 | Noguchi et al. ......... 280/730.2 |
| 2005/0134030 A1* | 6/2005 | Noguchi et al. ......... 280/730.2 |
| 2005/0140124 A1* | 6/2005 | Noguchi et al. ......... 280/730.2 |
| 2006/0066079 A1* | 3/2006 | Inoue et al. ............. 280/730.2 |
| 2006/0097493 A1* | 5/2006 | Nakanishi ................ 280/730.2 |
| 2006/0157958 A1* | 7/2006 | Heudorfer et al. ....... 280/730.2 |
| 2007/0046001 A1* | 3/2007 | Hirata ..................... 280/730.2 |
| 2007/0090634 A1* | 4/2007 | Jang et al. ............... 280/730.2 |

* cited by examiner

GUIDE UNIT FOR GUIDING CURTAIN AIRBAG AND CURTAIN AIRBAG DEVICE

BACKGROUND

The present invention relates generally to guide units for guiding curtain airbags that are deployed along inner side surfaces of vehicle cabins. In particular, it relates to guide units provided with link straps protruding from the curtain airbags and guide elements for guiding the link straps. The present invention also relates to curtain airbag devices provided with the guide units, In a vehicle provided with a curtain airbag device, when the vehicle is involved in, for example, a side-on collision or rollover, the curtain airbags are deployed downward along inner side surfaces (for example, doors and pillars) of the vehicle cabin so as to protect the head of each vehicle occupant and to keep each vehicle occupant inside the vehicle cabin.

U.S. Pat. No. 6,237,938 (incorporated by reference herein in its entirety) discloses an example in which guide elements are disposed along C pillars, Specifically, such guide elements are for guiding rear portions of curtain airbags, which are inflatable along the inner side surfaces of a vehicle cabin, downward along the pillars.

Moreover, such guide elements each include a track member having a box-shaped cross-section and a slider element that is disposed within the track member and is movable in the longitudinal direction of the track member. The rear portion of each curtain airbag is fixed to the slider element. In order to prevent the rear portion of curtain airbag from being retracted upward after being moved downward, latches are disposed at a regular interval along the track member.

The top and bottom ends of each track member are provided with mounting flanges, and each of the flanges is fixed to the C pillar with a bolt or a screw.

SUMMARY

One embodiment of the invention relates to a guide unit for guiding a curtain airbag. The guide unit comprises a guide element attached to a pillar of a vehicle and extending in the vertical direction for guiding the ends of a curtain airbag that is capable of being deployed downward along the inner side surface of the vehicle cabin; a link strap protruding from the curtain airbag and engaging with the guide clement; and a guide member for guiding the link strap into the space between a side edge of a pillar garnish and a vehicle member when the link strap moves downward with the deployment of the curtain airbag.

According to another embodiment of the invention, a curtain airbag device is provided. The curtain airbag device comprises a airbag that is capable of being deployed downward along an inner side surface of a vehicle cabin; and a guide unit. The guide unit comprises a guide element attached to a pillar of a vehicle and extending in the vertical direction for guiding the ends of the curt airbag that is capable of being deployed downward along the inn side surface of the vehicle cabin; a link sa protruding from the curtain airbag and engaging in the guide element; and a guide member for guiding the link strap into the space between a side edge of a pillar garnish and a vehicle member when the link strap moves downward with the deployment of the curtain airbag.

It is to be understood that both lie foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the follow description, appended claims, and the accompanying exemplary embodiments shown in the drawings, which are briefly described below.

FIGS. 1(a)-1(c) illustrate a curtain airbag device and a guide unit thereof according to an embodiment of the present invention.

FIGS. 3(a) and 3(b) illustrate the curtain airbag being deployed.

DETAILED DESCRIPTION

Hereinafter, embodiments of the present invention will be described with reference to the attached drawings.

An object of the present invention is to provide a guide unit for guiding a curtain airbag that allows quick deployment of the curtain airbag, and a curtain airbag device provided with the guide unit. Specifically, in the guide unit, a link strap that connects the curtain airbag and a guide element is smoothly guided into the space between a side edge of a pillar garnish and a vehicle member at the early stage of the deployment of the curtain airbag.

The guide unit of the curtain airbag accord to an embodiment of the present invention includes a guide element attached to a pillar of a vehicle and extending in the vertical direction for guiding the ends of the curtain airbag that is capable of being deployed downward along the inner side surface of the vehicle cabin; a link strap protruding from the curtain airbag and engaging with the guide element; and a guide member for guiding the link strap into the space between the side edge of the pillar garnish and the vehicle member when the link strap moves downward with the deployment of the curtain airbag.

The curtain airbag device according to an embodiment of the present invention includes the guide unit according to an embodiment of the present invention as a guiding unit.

According tonic guide unit of an embodiment, the guide member smoothly guides the link strap into the space between the pillar gash and the vehicle member at the early stage of the deployment of the curtain airbag. Thus, the curtain airbag can be deployed remarkably quickly.

In an embodiment of the present invention, the guide member is preferably disposed along the vehicle member, and the link strap is preferably disposed between the guide member and the vehicle member. With this structure, the guide member can reliably guide the link strap into the space between the pillar garnish and the vehicle member.

When the side edge of the pillar garish is in contact with a weather strip, the guide unit may include a guide member that guides the link strip into the space between the pillar garish and the weather strip. Accordingly, the link strap moves downward while ripping through the pillar garnish and the weather strip.

The guide member may be composed of a first guide member adjacent to the vehicle body and a second guide member adjacent to the interior of the vehicle cabin, and a link strap may be disposed between the guide plates. With this structure, the link strap does not complicate the assembling work when the weather strip is attached to the vehicle body.

The guide member may be integrated with the pillar garnish. With this structure, alignment between the guide member and the pillar garnish is not required. Moreover, assembling of a separate guide member is also not required. In this case, when a curtain-guide member that guides the curtain airbag towards the interior of the vehicle cabin away from the pillar garnish at the beginning of deployment of the curtain airbag, a supporting member for supporting the guide member disposed on the pillar garnish may be disposed on the curtain-guide member.

This guide member may be disposed on a pillar or a roof-side member. With this structure, the installation strength of the guide member can be significantly enhanced.

This guide member may be integrated with the guide unit. Accordingly, alignment between the guide member and the guide unit is not required. Moreover, assembling of a separate guide member is also not required.

In an embodiment of the present invention, when a curtain-guide member that guides the curtain airbag towards the interior of the vehicle cabin away from the pillar garnish at the beginning of deployment of the curtain airbag, the guide member may be integrated with this curtain-guide member. Thus, assembling of a separate guide member is not required.

According to an embodiment, whenever the guide member is disposed at any positions of the pillar, pillar garnish, roof-side member, curtain-guide member, and the like, the guide member preferably extends from above the top edge of the pillar garnish, and from the anterior position of the top edge adjacent to the front vehicle body or from the posterior position of the top edge adjacent to the rear vehicle body towards the inner side of the pillar garnish. This structure can smoothly and reliably guide the link strap into the space between the pillar garnish and the vehicle member.

According to the curtain airbag device and the guide unit of an embodiment of the present invention, the link strap that connects the curtain airbag and the guide element is smoothly guided into the space between the side edge of the pillar garnish and the vehicle member such as the weather strip at the early stage of the deployment of the curtain airbag. This allows quick deployment of the curtain airbag.

Figures 1A, 1B:
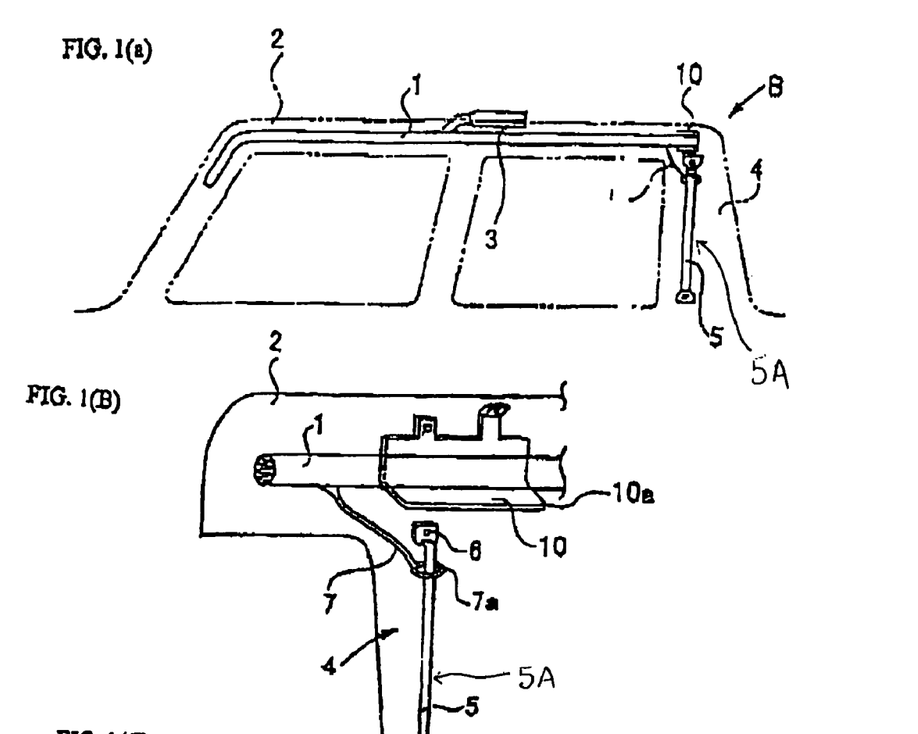
FIG. 1(a) illustrates a curtain airbag disposed along a roof side to a C pillar of a vehicle, and a guide rod of the curtain airbag.
FIG. 1(b) is an enlarged perspective view around a B portion shown in FIG. 1(a).
Figure 1C:
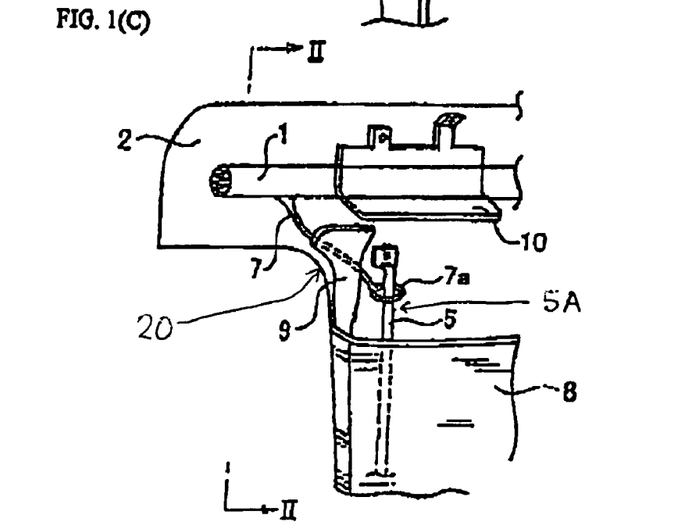
FIG. 1(c) illustrate the B portion shown in FIG. 1(b) provided with a pillar garnish.
Figure 2:
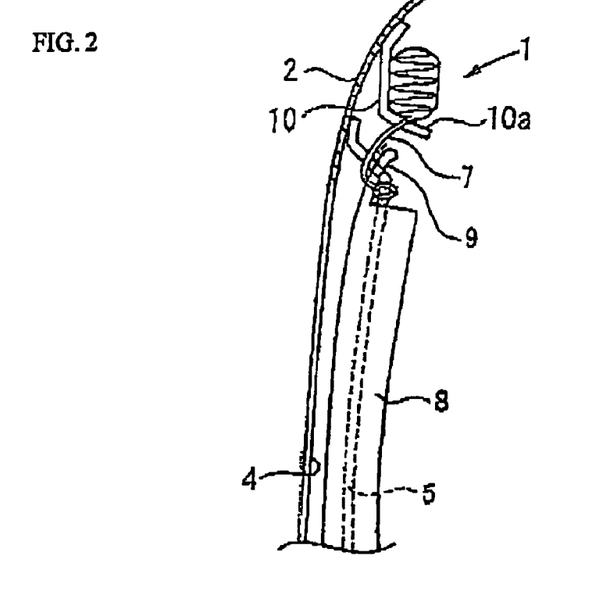
FIG. 2 is a cross-sectional view taken along line II-II in FIG. 1(c).
Figure 3A:
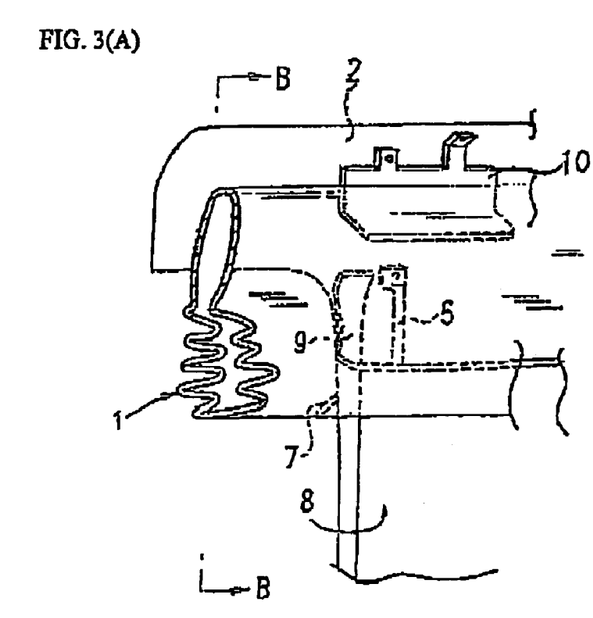
FIG. 3(a) is a perspective view.
Figure 3B:
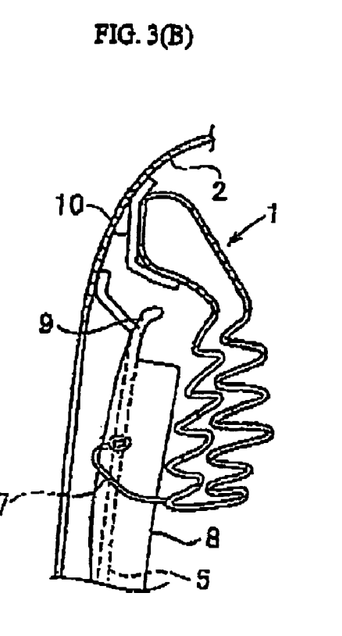
FIG. 3(b) is a cross-sectional view taken along line B-B in FIG. 3(a).

Embodiments will now be described with reference to the drawings. FIG. 1 illustrates a curtain airbag device and a guide unit thereof according to an embodiment of the present invention. FIG. 1(a) illustrates a curtain airbag disposed along a roof side to a C pillar 4 of a vehicle, and a guide rod of the curtain airbag. FIG. 1(b) is an enlarged perspective view around a B portion shown in FIG. 1(a). FIG. 1(c) illustrates the B portion shown in FIG. 1(b) provided with a pillar garnish. In FIGS. 1(a) and 1(b), the pillar garnish is not illustrated FIG. 2 is a cross-sectional view taken along line II-II in FIG. 1(c). FIG. 3 illustrates the curtain airbag being deployed. FIG. 3(a) is a perspective view, and FIG. 3(b) is a cross-sectional view taken along line B-B in FIG. 3(a).

According to this embodiment, a curtain airbag 1 is disposed along a roof side 2 of a vehicle (border section between the ceiling and inner side surface of a vehicle cabin) while being folded in a slender manner in the longitudinal direction of the vehicle. When a vehicle is involved in a side-on collision or a rollover, for example, the curtain airbag 1 is inflated as a result of gas being sent from an inflator 3. The curtain airbag 1 is deployed in the downward direction of the vehicle body along the side surface, i.e. doors and pillars, in the vehicle cabin. An upper edge of the curtain airbag 1 is provided with tabs (not shown) that are fastened to the roof side 2.

A C pillar 4 of the vehicle has a guide rod 5 attached thereto, which functions as a guide element 5A for guiding the rear portion of the curtain airbag 1 along the C pillar 4 while the curtain airbag 1 is being deployed along the C pillar 4 in the downward direction of the vehicle body. The guide rod 5 has a rod-like element that extends along the C pillar 4 in the vertical direction of the vehicle body. Both the upper and lower ends of the guide rod 5 are fixed to the C pillar 4 with, for example, bolts 6.

The bottom corner area in the rear portion of the curtain airbag 1 has a base end of a link strap 7 attached thereto. On the other hand, a loop 7a at a front end of the link strap 7 is loosely fixed around the guide rod 5. The loop 7a is movable along the guide rod 5 in the vertical direction.

The cabin-side of the C pillar 4 is covered with a pillar garnish 8. A weather strip (not shown) is attached to the doorframe portion of the C pillar 4, and is in contact with the side edge of the pillar garnish 8.

A guide member 9 protrudes upward from the top end of the pillar garnish 8 so as to guide the link strap 7 into the space between the side edge of the pillar garnish 8 and a vehicle member 20, such as the weather strip at the early stage of the deployment of the curtain airbag 1. In this embodiment, the guide member 9 is integrated with the pillar garnish 8, however, the guide member 9 may be attached to the pillar garnish 8.

A curtain-guide member 10, also known as a jump base, is disposed on the roof side 2 above the C pillar 4. At the beginning of deployment of the curtain airbag 1, the curtain guide member 10 allows the curtain airbag 1 to pass over the top of the pillar garnish 4 so as to guide the curtain airbag 1 towards the interior of the vehicle cabin. As shown in FIG. 2, the bottom portion 10a of this curtain-guide member 10 protrudes downslope from the roof side 2 towards the interior of the vehicle cabin.

As shown in FIG. 1(c), the link strap 7 is disposed between the guide member 9 and the C pillar 4 before the curtain airbag 1 is deployed.

The guide member 9 protrudes upward from the front edge of the pillar garnish 8. The side edge of the pillar garnish 8 is connected to the side edge of the guide member 9, and the connection forms a consecutive smooth plane.

Although not shown in FIGS. 1 to 3, the roof side 2 is provided with a roof-side garnish that also covers the curtain airbag 1. This roof-side garnish is disposed so as to face the pillar garnish 8. This roof-side garnish covers the guide member 9.

When a vehicle provided with such a curtain airbag device is involved in a side-on collision or a rollover, the inflator 3 generates gas so as to inflate the curtain airbag 1. The curtain airbag 1 pushes to open the roof-side garnish, and guides the curtain-guide member 10 towards the interior of the vehicle cabin away from the top end of the pillar garnish 8. Subsequently, the curtain airbag 1 begins to be deployed downward along the cabin-side of a pillar garnish 8.

The rear portion of the deployed curtain airbag 1 is guided by the guide rod 5 via the link strap 7. The link strap 7 moves downward along the guide rod 5 when the curtain airbag 1 begins to be deployed At this moment, the link strap 7 is smoothly guided into the space between the pillar garnish 8 and the weather strip by the guide member 9. The link strap 7 moves downwind while ripping through the pillar garnish 8 and the weather strip during the deployment of the curtain airbag 1.

The link strap 7 moves downward along the guide rod 5 until the curtain airbag 1 reaches the bottommost point of deployment. Since the link strap 7 connects the curtain airbag 1 and the guide rod 5, tie curtain airbag 1 can be deployed along the side surface of the vehicle cabin.

Due to the guide member 9 according to this embodiment, the link strap 7 can smoothly move, and the curtain airbag 1 can be quickly deployed.

Since the guide member 9 is disposed on the pillars garnish 8 in this embodiment, the alignment between the guide member 9 and the pillar garnish 8 is not required. Moreover, many hours for assembling a separate guide member 9 can be saved.

Figure 8:
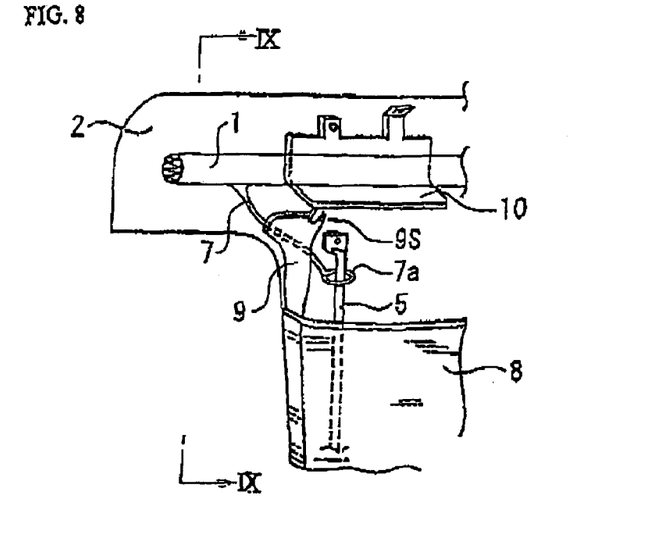
FIG. 8 is a perspective view illustrating another embodiment of the present invention.
Figure 9:
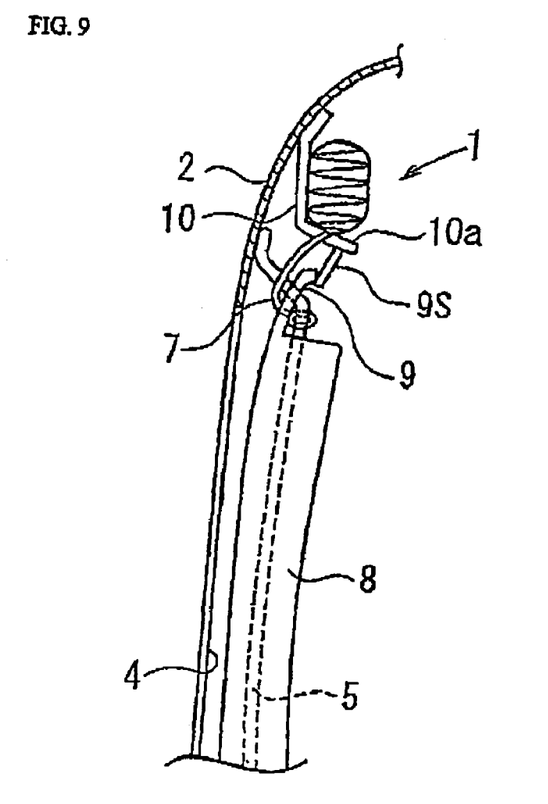
FIG. 9 is a cross-sectional view taken along line IX-IX in FIG. 8.
Figures 10A, 10B:
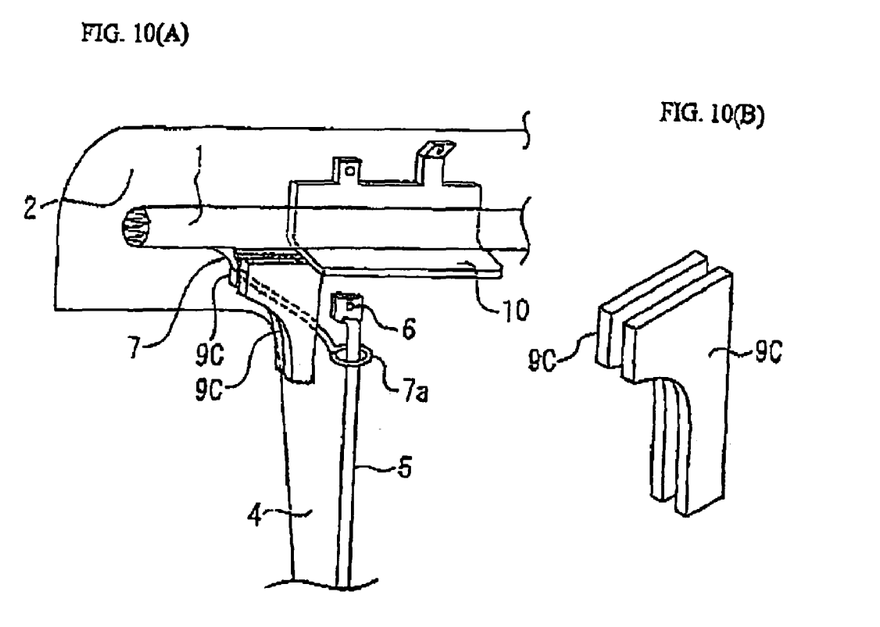
FIG. 10(a) is a perspective view illustrating another embodiment of the present invention.
FIG. 10(b) is a perspective view of a guide member shown in FIG. 10(a).

As shown in FIGS. 8 and 9, a supporting member 9S for supporting the guide member 9 may be disposed on the curtain-guide member 10. With the structure, self-sustaining strength of the guide member 9 can be enhanced.

Figure 4:
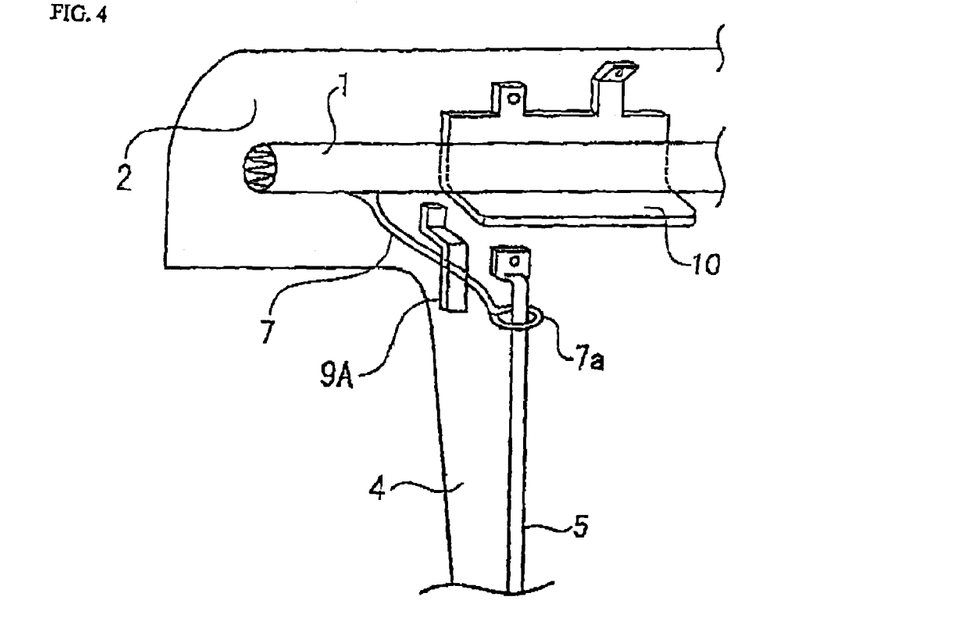
FIG. 4 is a perspective view illustrating another embodiment of the preserved invention.

In an embodiment of the present invention, as shown in FIG. 4, a guide member 9A may be attached to the roof side 2.

Figure 5:
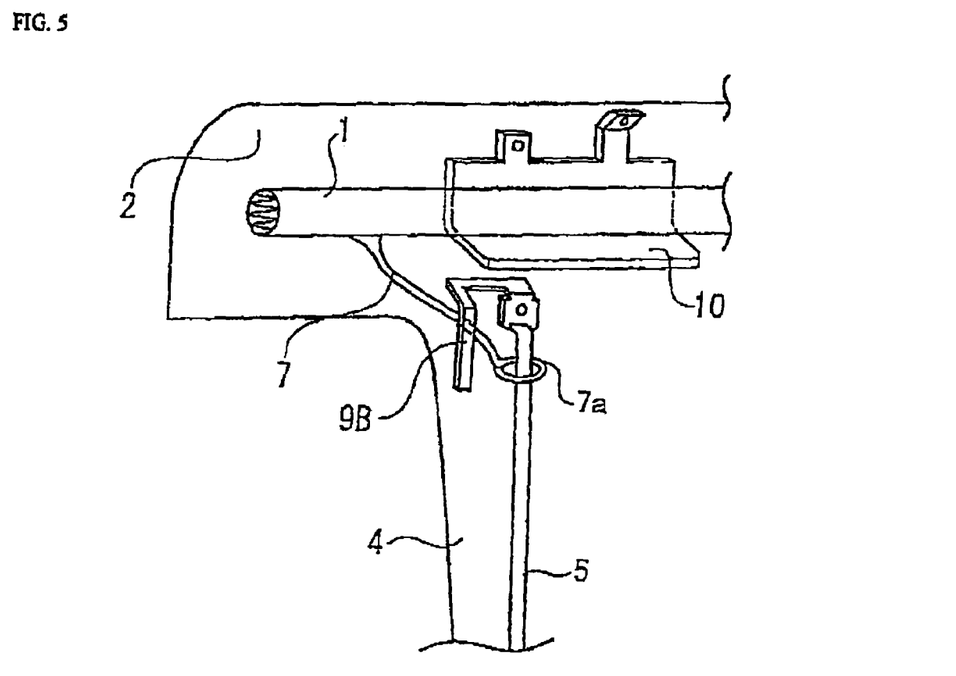
FIG. 5 is a perspective view illustrating another embodiment of the present invention.
Figure 6:
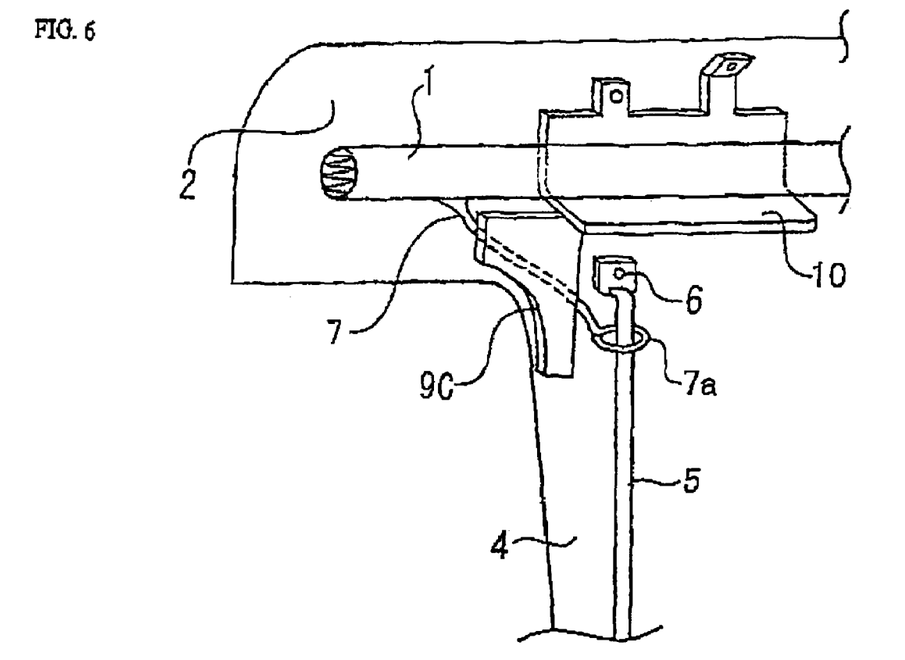
FIG. 6 is a perspective view illustrating another embodiment of the present invention.

Furthermore, as shown in FIG. 5, a guide member 9B may be integrated with the guide rod 5, or, as shown in FIG. 6, a guide member 9C may be integrated with the curtain-guide member 10. With the structures shown in FIGS. 5 and 6, many hours for assembling a separate guide member 9B or 9C can also be saved.

In FIGS. 4 to 6, the pillar garnish and the roofside garnish are not illustrated.

Figure 11A:
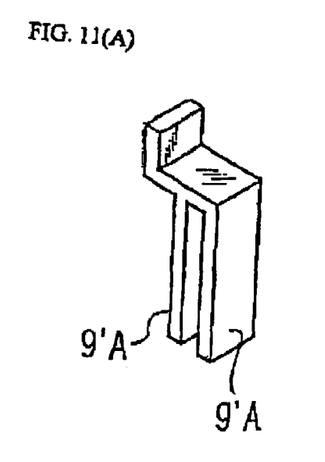
FIGS. 11(a) and 11(b) are perspective views of guide members employed for other embodiments.
Figure 11B:
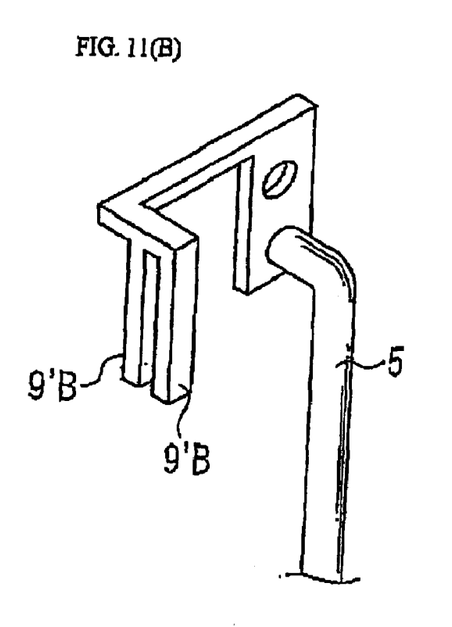

In the embodiments shown in FIGS. 4 to 6, the guide member may be composed of a first guide member adjacent to the vehicle body and a second guide member adjacent to the interior of the vehicle cabin, and a link strap may be disposed between the guide plates. With this structure, the link strap does not complicate the assembling work when a weather strip, for example, is attached to the vehicle body. In the embodiment shown in FIG. 10, a pair of guide members 9C is included in the embodiment shown in FIG. 6 instead of the guide member 9C, and the link strap 7 is disposed between the guide members 9C. FIGS. 11(a) and 11(b) illustrates examples of guide members 9'A and 9'B employed for the embodiments shown in FIGS. 4 and 5.

Figure 7:
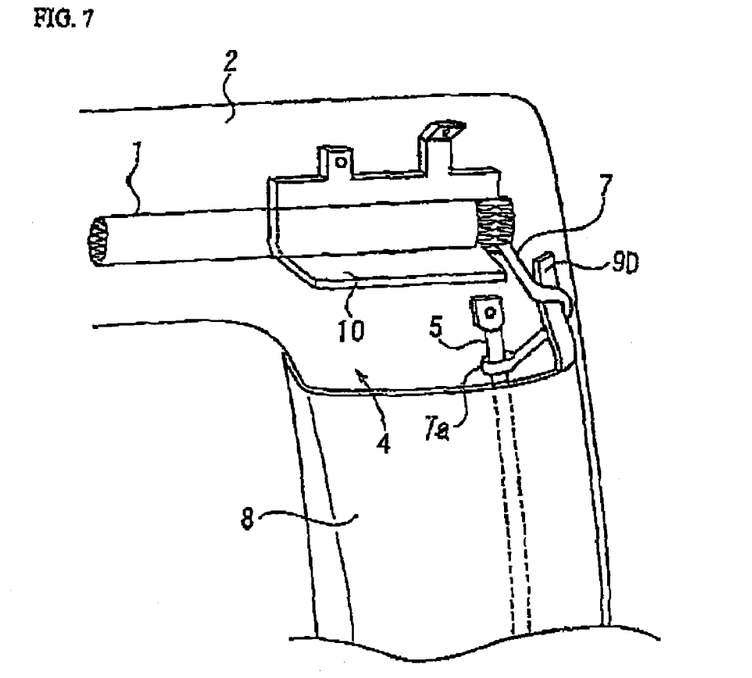
FIG. 7 is a perspective view illustrating another embodiment of the present invention.

FIG. 7 illustrates an embodiment in which a guide member 9D protrudes upward from the top end adjacent to the rear edge of the pillar garnish 8 so as to guide the link strap 7 into the space between the side edge adjacent to the rear edge of the C pillar 4 and the vehicle members. The guide member 9D is integrated with the pillar garnish 5. The rear-side edge of the guide member 9D is connected to the rear-side edge of the pillar garnish 8, and the connection forms a consecutive smooth plane.

In FIG. 7, the roof-side garnish is not illustrated.

In FIG. 7, the guide member 9D is disposed on the pillar garnish 8, however, the guide member 9D may be disposed on the roof side 2, the curtain-guide member 10, the guide rod 5, or the like.

Japan Priority Application 2003-422453, filed Dec. 19, 2003 including the specification, drawings, claims and abstract, is hereby incorporated herein by reference in its entirely.

The technical scope of the present invention is not limited to the above embodiments, and modifications are permissible within the scope of the present invention. For example, the guide rod and the link strap may be disposed so as to guide the curtain airbag along a B pillar or an A pillar. Furthermore, guide elements other than the guide rod may be employed.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A guide unit for guiding a curtain airbag, comprising:
   a guide element attached to a pillar of a vehicle and extending in the vertical direction for guiding the ends of a curtain airbag that is capable of being deployed downward along the inner side surface of the vehicle cabin;
   a strap protruding from the curtain airbag and engaging with the guide element; and
   a guide member for guiding the strap into the space between a side edge of a pillar garnish and a vehicle member when the strap moves downward with the deployment of the curtain airbag, wherein the guide member is disposed on the pillar garnish.

2. A guide unit for guiding a curtain airbag, comprising:
   a guide element attached to a pillar of a vehicle and extending in the vertical direction for guiding the ends of a curtain airbag that is capable of being deployed downward along the inner side surface of the vehicle cabin;
   a strap protruding from the curtain airbag and engaging with the guide element; and
   a guide member for guiding the strap into the space between a side edge of a pillar garnish and a vehicle member when the strap moves downward with the deployment of the curtain airbag, wherein the guide member is disposed along the vehicle member, and
   wherein the strap is disposed between the guide member and the vehicle member.

3. The guide unit according to claim 2, wherein
the guide member comprises a first guide plate adjacent to the vehicle body and a second guide plate adjacent to the interior of the vehicle cabin; and
the strap is disposed between the guide plates.

4. The guide unit according to claim 2, further comprising:
a curtain-guide member for guiding the curtain airbag towards the interior of the vehicle cabin away from the pillar garnish at the beginning of deployment of the curtain airbag; and
a supporting member disposed on the curtain-guide member for supporting the pillar garnish.

5. The guide unit according to claim 1, wherein a side edge of the pillar garnish is connected to a side edge of the guide member, forming a consecutive, substantially smooth plane.

6. The guide unit according to claim 2, wherein the guide member is disposed on the pillar or a roof-side member.

7. The guide unit according to claim 2, wherein the guide member is disposed on the guide element.

8. The guide unit according to claim 2, further comprising:
a curtain-guide member for guiding the curtain airbag towards the interior of the vehicle cabin away from the pillar garnish at the beginning of deployment of the curtain airbag, wherein the curtain-guide member is provided with the guide member.

9. The guide unit according to claim 1, wherein the guide member extends from above the top edge of the pillar garnish, and from the anterior position of the top edge adjacent to the front vehicle body or from the posterior position of the top edge adjacent to the rear vehicle body towards the inner side of the pillar garnish.

10. A curtain airbag device, comprising:
a curtain airbag that is capable of being deployed downward along an inner side surface of a vehicle cabin; and
a guide unit comprising:
a guide element attached to a pillar of a vehicle and extending in the vertical direction for guiding the ends of the curtain airbag that is capable of being deployed downward along the inner side surface of the vehicle cabin;
a strap protruding from the curtain airbag and engaging with the guide element; and
a guide member for guiding the strap into the space between a side edge of a pillar garnish and a vehicle member when the strap moves downward with the deployment of the curtain airbag, wherein the guide member is disposed on the pillar garnish.

11. A curtain airbag device, comprising:
a curtain airbag that is capable of being deployed downward along an inner side surface of a vehicle cabin; and
a guide unit comprising:
a guide element attached to a pillar of a vehicle and extending in the vertical direction for guiding the ends of the curtain airbag that is capable of being deployed downward along the inner side surface of the vehicle cabin;
a strap protruding from the curtain airbag and engaging with the guide element; and
a guide member for guiding the strap into the space between a side edge of a pillar garnish and a vehicle member when the strap moves downward with the deployment of the curtain airbag, wherein the guide member is disposed along the vehicle member, and
wherein the strap is disposed between the guide member and the vehicle member.

12. The curtain airbag device according to claim 11, wherein
the guide member comprises a first guide plate adjacent to the vehicle body and a second guide plate adjacent to the interior of the vehicle cabin; and
the strap is disposed between the guide plates.

13. The curtain airbag device according to claim 10, further comprising:
a curtain-guide member for guiding the curtain airbag towards the interior of the vehicle cabin away from the pillar garnish at the beginning of deployment of the curtain airbag; and
a supporting member disposed on the curtain-guide member for supporting the pillar garnish.

14. The curtain airbag device according to claim 10, wherein a side edge of the pillar garnish is connected to a side edge of the guide member, forming a consecutive, substantially smooth plane.

15. The curtain airbag device according to claim 11, wherein the guide member is disposed on the pillar or a roof-side member.

16. The curtain airbag device according to claim 11, wherein the guide member is disposed on the guide element.

17. The curtain airbag device according to claim 11, further comprising:
a curtain-guide member for guiding the curtain airbag towards the interior of the vehicle cabin away from the pillar garnish at the beginning of deployment of the curtain airbag, wherein the curtain-guide member is provided with the guide member.

18. The curtain airbag device according to claim 10, wherein the guide member extends from above the top edge of the pillar garnish, and from the anterior position of the top edge adjacent to the front vehicle body or from the posterior position of the top edge adjacent to the rear vehicle body towards the inner side of the pillar garnish.

* * * * *